April 24, 1928.  M. E. VANSICKLE  1,667,575

GEARING FOR INSTRUMENT DIALS

Filed Feb. 2, 1924

M. E. VANSICKLE INVENTOR.

BY John B Brady
ATTORNEY

Patented Apr. 24, 1928.

1,667,575

UNITED STATES PATENT OFFICE.

MELVIN E. VANSICKLE, OF NEWARK, NEW JERSEY, ASSIGNOR, BY MESNE ASSIGNMENTS, TO BRANDES LABORATORIES INC., OF NEWARK, NEW JERSEY, A CORPORATION OF NEW JERSEY.

GEARING FOR INSTRUMENT DIALS.

Application filed February 2, 1924. Serial No. 690,162.

My invention relates broadly to electrical apparatus, and more particularly to the construction of a device for adjusting various electrical instruments.

One of the objects of my invention is to provide a gearing for a dial secured upon the operating shaft of an electrical instrument for rotating the shaft with precision of movement.

Another object of the invention is to provide a gearing for a dial for the rotation of an instrument shaft in which the dial carries a planetary gear which may be engaged with a fixed gear or surface for rotating the instrument shaft through extremely minute angles.

Still another object of my invention is to provide a construction of dial comprising a disk arranged to be secured upon the extremity of an instrument shaft with a relatively small adjusting gear mounted to rotate upon an axis at right angles to the axis of the dial and located in a position adjacent the periphery of the dial and arranged in such manner that the small adjusting gear operates to roll upon a panel or cover for the instrument to rotate the instrument shaft through variable increments of distance.

My invention finds particular application in radio apparatus where fineness in tuning adjustment becomes essential in securing selectivity. In variable condensers employed in association with a coil antenna or in shunt with the secondary circuit of a receiving system, small capacity changes cause considerable difference in tuning. In adjusting the inductive relation of coils in tuning inductaces minute changes in angular position cause great change in tuning adjustments. It is for this purpose that I have developed a gearing for a dial which may be secured to the rotatable shaft of the instrument which projects through an instrument case or panel. The gearing engages with the surface of the instrument case or panel and enables me to secure rotation of the instrument shaft through extremely small angles.

Figure 1:
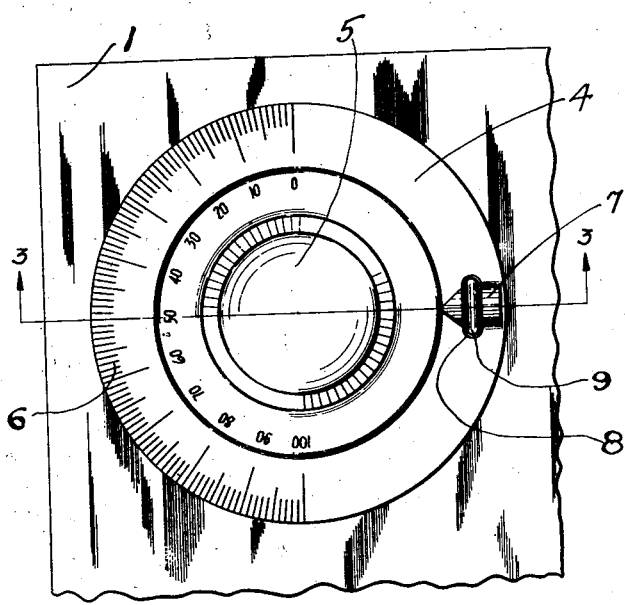
Figure 2:
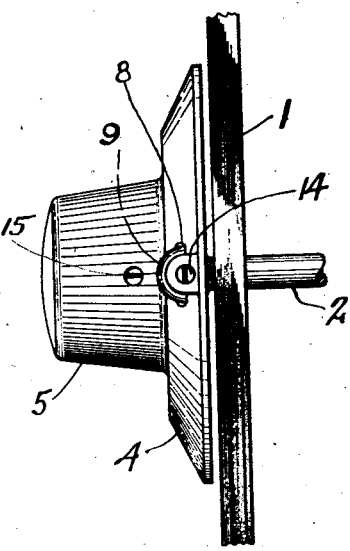
Figure 3:
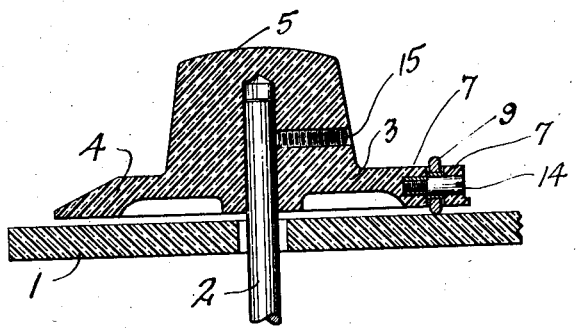
Figure 4:
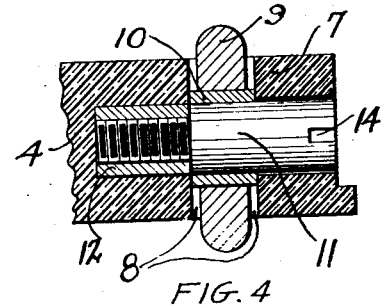

My invention will be more clearly understood by reference to the accompanying drawings, in which:

Figure 1 is a plan view showing the arrangement of the gearing for the dial where the dial is secured to the extremity of an instrument shaft which protrudes through a panel behind which the apparatus may be located; Fig. 2 is a side elevation showing the dial gearing and a fragmentary portion of the panel behind which the apparatus is positioned; Fig. 3 is a cross sectional view of my dial gearing; and Fig. 4 is an enlarged detailed fragmentary section showing the planetary gear which I mount within the dial.

In the drawings, the panel has been represented by reference character 1. The instrument shaft which projects through an aperture in the panel is shown by reference character 2. The dial is represented by reference character 3 and includes a disk shaped portion 4 and a knob portion 5 by which the dial may be grasped and turned. The disk portion may be suitably calibrated as represented at 6 to cooperate with an index on panel 1 to determine the relative rotation of the instrument shaft 2. In one position adjacent the periphery of the disk portion 4 I provide an upstanding or enlarged projection 7 integral with the disk portion 4. A slot 8 is provided in this enlarged portion 7 in a line at right angles to a radial line through the disk 4. Interposed between the parallel walls of the slot 8 I mount a relatively small rotatable member 9. The rotatable member 9 is centered upon a sleeve bearing 10 mounted to rotate upon screw member 11 as an axis. The screw member 11 engages an insert 12 carried in the disk member 4 and is screwed into the insert by revolving screw head 14 from the peripheral edge of the enlarged portion 7 on disk 4.

In the operation of my gearing for dials, the dial is properly positioned on the instrument shaft 2 by means of set screw 15 at such a distance from the panel 1 that the rotary member 9 frictionally engages the surface of panel 1. In order to move the instrument shaft through extremely small increments of distance the finger may be employed to revolve the rotary member 9 operating to rotate the instrument shaft in proportion to the ratio of the diameter of the rotary member 9 and the distance between the central axis of the dial and the center line of the rotary member 9. In order to move the instrument shaft through larger angular distances the portion 5 of the dial is grasped and rotated to the desired angle. It will be appreciated that with my construction an extremely fine vernier adjustment is obtainable for insuring maximum selectivity in the tuning of radio apparatus.

While I have described my invention in certain particular embodiments, it is to be understood that modifications may be made and that I intend no limitations upon the invention other than are imposed by the scope of the appended claim.

Having thus described my invention, what I claim and desire to secure by Letters Patent of the United States is as follows:

A dial for revolving an instrument shaft arranged to project through a stationary panel comprising a rotatable member having a central knob thereon, a substantially flat circular portion extending from said knob, a shaft member projecting through the peripheral edge of said circular portion in a radial direction and screw threaded into said circular portion, a roller journaled on said shaft member and projecting through said flat circular portion for frictionally engaging the surface of said stationary panel, said flat circular portion being beveled around its peripheral edge on opposite sides of said shaft member for receiving indicia thereon.

In testimony whereof I affix my signature.

MELVIN E. VANSICKLE.